US010400149B2

(12) United States Patent
Schultz et al.

(10) Patent No.: US 10,400,149 B2
(45) Date of Patent: Sep. 3, 2019

(54) IMPROVING GLIDE IN REFRIGERANT BLENDS AND/OR AZEOTOPIC BLENDS, ALTERNATIVES TO R123 REFRIGERANT, AND REFRIGERANT COMPOSITIONS, METHODS, AND SYSTEMS THEREOF

(71) Applicant: TRANE INTERNATIONAL INC., Davidson, NC (US)

(72) Inventors: Kenneth J. Schultz, Onalaska, WI (US); Stephen A. Kujak, Brownsville, MN (US)

(73) Assignee: TRANE INTERNATIONAL INC., Davidson, NC (US)

(*) Notice: Subject to any disclaimer, the term of this patent is extended or adjusted under 35 U.S.C. 154(b) by 36 days.

(21) Appl. No.: 15/569,272

(22) PCT Filed: Apr. 27, 2016

(86) PCT No.: PCT/US2016/029627
§ 371 (c)(1),
(2) Date: Oct. 25, 2017

(87) PCT Pub. No.: WO2016/176369
PCT Pub. Date: Nov. 3, 2016

(65) Prior Publication Data
US 2018/0112113 A1 Apr. 26, 2018

Related U.S. Application Data

(60) Provisional application No. 62/153,414, filed on Apr. 27, 2015, provisional application No. 62/153,439, filed on Apr. 27, 2015.

(51) Int. Cl.
C09K 5/04 (2006.01)
F25B 45/00 (2006.01)

(52) U.S. Cl.
CPC .............. *C09K 5/044* (2013.01); *C09K 5/045* (2013.01); *F25B 45/00* (2013.01);
(Continued)

(58) Field of Classification Search
CPC .............. C09K 5/044; C09K 2205/122; C09K 2205/126; C09K 2205/22; C09K 2205/32; C09K 2205/40; F25B 45/00
See application file for complete search history.

(56) References Cited

U.S. PATENT DOCUMENTS 7,442,321 B1    10/2008  Chen et al.
7,569,170 B2*    8/2009  Minor ............... A62D 1/0057
                                                  264/53
(Continued)

FOREIGN PATENT DOCUMENTS

WO    2011-091404    7/2011
WO    2014-047112    3/2014

OTHER PUBLICATIONS

International Search Report and Written Opinion, International Patent Application No. PCT/US2016/029627, dated Aug. 10, 2016 (13 pages).

(Continued)

Primary Examiner — Frantz F Jules
Assistant Examiner — Martha Tadesse
(74) Attorney, Agent, or Firm — Hamre, Schumann, Mueller & Larson, P.C.

(57) ABSTRACT

Methods of using refrigerant compositions and systems thereof are described. In particular, methods of using refrigerant compositions and systems thereof, include refrigerant compositions including a two component blend. One of the components is a refrigerant blend that, when first combined, is considered an azeotropic blend, azeotrope, near azeotropic, or the like. This component is one component of the two (Continued)

components of the resulting refrigerant composition, which is combined with a second component being another refrigerant.

8 Claims, 3 Drawing Sheets

(52) U.S. Cl.
CPC .. *C09K 2205/122* (2013.01); *C09K 2205/126* (2013.01); *C09K 2205/22* (2013.01); *C09K 2205/32* (2013.01); *C09K 2205/40* (2013.01)

(56) References Cited

U.S. PATENT DOCUMENTS

| | | | | |
|---|---|---|---|---|
| 7,708,903 | B2* | 5/2010 | Sievert | C09K 5/045 252/68 |
| 7,862,740 | B2* | 1/2011 | Minor | A62D 1/0057 252/68 |
| 7,914,698 | B2 | 3/2011 | Minor et al. | |
| 7,972,524 | B2 | 7/2011 | Robin | |
| 8,058,070 | B2* | 11/2011 | Minor | C09K 5/045 436/2 |
| 8,632,703 | B2 | 1/2014 | Robin | |
| 8,680,037 | B2 | 3/2014 | Robin | |
| 8,871,112 | B2* | 10/2014 | Minor | C08J 9/149 252/67 |
| 8,961,808 | B2 | 2/2015 | Robin | |
| 8,961,811 | B2* | 2/2015 | Minor | C08J 9/146 252/67 |
| 9,003,797 | B2 | 4/2015 | Kontomaris | |
| 9,249,347 | B2* | 2/2016 | Minor | C09K 5/045 |
| 2005/0178999 | A1* | 8/2005 | Minor | C09K 5/045 252/68 |
| 2010/0078585 | A1* | 4/2010 | Robin | A62D 1/0057 252/2 |
| 2010/0123095 | A1* | 5/2010 | Minor | C08J 9/149 252/68 |
| 2010/0326095 | A1* | 12/2010 | Van Horn | C09K 5/044 62/77 |
| 2011/0144216 | A1* | 6/2011 | Hulse | A01N 29/02 514/757 |
| 2011/0226004 | A1 | 9/2011 | Kontomaris | |
| 2012/0104307 | A1 | 5/2012 | Bogdan et al. | |
| 2012/0167599 | A1 | 7/2012 | Kontomaris | |
| 2013/0104548 | A1 | 5/2013 | Kontomaris | |
| 2013/0104573 | A1 | 5/2013 | Kontomaris | |
| 2013/0104575 | A1 | 5/2013 | Kontomaris | |
| 2013/0292599 | A1 | 11/2013 | Robin | |
| 2014/0069129 | A1* | 3/2014 | Hulse | C09K 5/044 62/115 |
| 2014/0131613 | A1* | 5/2014 | Vishnevsky | C09K 5/042 252/67 |
| 2014/0165626 | A1* | 6/2014 | Van Horn | C09K 5/044 62/79 |
| 2015/0014606 | A1 | 1/2015 | Robin et al. | |

OTHER PUBLICATIONS

Extended European Search Report, European Patent Application No. 16787099.7, dated Jul. 10, 2018 (7 pages).

* cited by examiner

IMPROVING GLIDE IN REFRIGERANT BLENDS AND/OR AZEOTOPIC BLENDS, ALTERNATIVES TO R123 REFRIGERANT, AND REFRIGERANT COMPOSITIONS, METHODS, AND SYSTEMS THEREOF

FIELD

The disclosure herein relates to refrigerant compositions, which can be used in, for example, refrigeration, air conditioning, and/or heat pump systems, which, for example, can be incorporated into a heating, venting and air conditioning (HVAC) system or unit.

BACKGROUND

Zeotropic blends have concentrations of constituents that are different in the liquid and vapor phases at equilibrium. A consequence of this is that the dew point temperature (temperature at which condensation first begins) is different from the bubble point temperature (temperature at which evaporation or bubble formation first begins) at a given pressure. The difference between the dew and bubble points is termed the "temperature glide". This temperature glide affects the temperature differences that drive heat transfer in a heat exchanger. In addition, there are mass transfer effects because of the differences in liquid and vapor phase concentrations of constituents. It is generally found that refrigerant blends with large temperature glides are not suitable for use in shell-and-tube heat exchangers.

Blends that are zeotropic in nature are more common than azeotropic blends, and it may be more common to find a zeotropic blend that will match the characteristics of refrigerant R123. To match the capacity of R123 with a zeotropic blend requires one component to be lower pressure (higher boiling point) than R123 and the other to be higher pressure (lower boiling point). For lower pressure refrigerants, R1336mzz(Z) is the only new low GWP HFO known to be under serious development for commercial application as a refrigerant and foam blowing agent. Generally, the farther apart the normal boiling points are of the two blend constituents, the greater will be the temperature glide.

SUMMARY

Improvements may be made upon refrigerant blends, including zeotropic, azeotropic blends, and/or refrigerant R123. Although single component or azeotropic refrigerants have been common in use in refrigeration, air conditioning, and/or heat pump systems, the use of zeotropic blends may replace such existing refrigerants, which in some cases are scheduled to be disallowed from future use by regulations or other reasons.

Refrigerant compositions, methods of their manufacture, and/or methods of their use are described herein.

In some embodiments, the refrigerant composition includes a binary blend. In an embodiment, the binary blend is a replacement for R123.

In some embodiments, the refrigerant composition includes a blend of three refrigerants.

In some embodiments, the refrigerant composition includes two components including three refrigerants.

In some embodiments, the refrigerant composition includes a two component blend, where one of the components is a refrigerant blend that, when first combined, is considered an azeotropic blend, azeotrope, near azeotropic, or the like. In some embodiments, the refrigerant blend is of two refrigerants. This refrigerant blend is considered the first component, which is present as an azeotrope or near azeotrope, and is then combined with a second component being another refrigerant. In some embodiments, the second component is a third refrigerant that, in some examples, will improve the capacity and/or the glide properties of the overall refrigerant composition. In some examples, improving the glide includes improving the capacity and/or reducing glide that would otherwise be present in the two component refrigerant blend alone.

In some embodiments, the refrigerant composition is a blend that considers properties including for example solubility in the lubricant, toxicity, temperature glide, and global warming potential (GWP).

In some embodiments, the refrigerant composition herein is a suitable replacement for refrigerant R123 in terms of its properties and performance at various operating conditions in a refrigeration system.

In some embodiments, the refrigerant composition herein is a suitable "drop in" replacement and, in some embodiments, may be applied or otherwise implemented as a retrofit refrigerant composition.

In some embodiments, the refrigerant composition herein is suitable for use in various applications including for example a refrigeration system and/or a heating, ventilation, and air conditioning (HVAC) systems.

In some embodiments, such applications include fluid chiller applications, including for example water chillers. In some embodiments, a fluid chiller includes for example chillers operating with a centrifugal compressor. In some embodiments, a fluid chiller is hermetically sealed and in some examples operates at below atmospheric pressure. In some embodiments, the fluid chiller includes a purge system. In some embodiments, the purge system does not include a carbon canister or regeneration device.

In some embodiments, the refrigerant composition may be suitable for use in refrigeration systems, which may employ screw compressors. In some embodiments, the refrigerant composition may be suitable for use in systems with a heat pump.

In some embodiments, the refrigerant composition may be suitable for use in a refrigeration system with one or more of an evaporator, condenser, and/or an economizer, and/or where the compressor has one or more stages of compression, such as including one to four stages of compression.

In an embodiment, a method of reducing temperature glide of a refrigerant composition in an HVAC system includes adding an amount of a first refrigerant to an amount of a second refrigerant to make a first component. The first component is an azeotropic or near azeotropic blend. The method further includes adding a second component to the first component. The second component is an amount of a third refrigerant to obtain a resulting refrigerant composition. The method further includes operating the HVAC system, wherein the resulting refrigerant composition thereby exhibits reduced temperature glide during the operating of the HVAC system.

In an embodiment, an HVAC system includes a water chiller including a centrifugal compressor. The water chiller is hermetically sealed and operates at below atmospheric pressure. A refrigerant composition of the HVAC system includes a first component and a second component. The first component is a refrigerant blend of two refrigerants that, when first combined, is an azeotropic blend, to which the second component is added. The second component being a single refrigerant that reduces temperature glide of the refrigerant composition during operation of the water chiller.

In an embodiment, a method of preparing a refrigerant composition includes adding an amount of a first refrigerant to an amount of a second refrigerant to make a first component. The first component is an azeotropic or near azeotropic blend. The method further includes adding a second component to the first component. The second component is an amount of a third refrigerant to obtain a resulting refrigerant composition. The resulting refrigerant composition exhibits reduced temperature glide during operation of an HVAC system.

In an embodiment, the adding an amount of the first refrigerant to an amount of the second refrigerant includes weighing the amount of the first refrigerant and the amount of the second refrigerant, and combining the weighed amount of the first refrigerant with the weighed amount of the second refrigerant. In an embodiment, the adding of the second component includes weighing the amount of the third refrigerant and combining the weighed amount of the third refrigerant with the first component.

In an embodiment, a method of preparing a refrigerant composition includes reclaiming the first component from a volume of refrigerant composition from at least one refrigerant container. The method further includes removing impurities from the reclaimed volume of the refrigerant composition, and combining the first component, which is reclaimed, with the second component.

In an embodiment, a method of preparing a refrigerant composition includes retrofitting an existing refrigerant composition, wherein the existing refrigerant composition includes the first component. The method includes adding the second component at the location of the first component.

DETAILED DESCRIPTION

Figure 1:
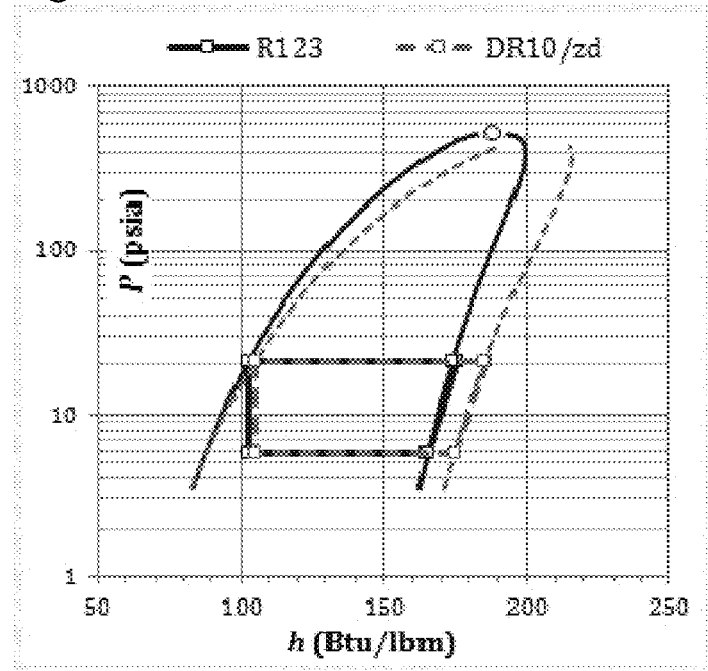
FIGS. 1-5 illustrate characteristics and properties of various embodiments of refrigerant compositions. The results and properties reported in FIGS. 1-5 may be estimated by an Excel-based thermodynamic cycle calculation tool that calls a thermodynamics properties calculator, such as for example provided by the National Institute of Standards and Technology (NIST), e.g. the REFPROP program.

Refrigerant compositions, methods of their manufacture, and/or methods of their use are described herein.

In some embodiments, the refrigerant composition includes a binary blend. In an embodiment, the binary blend is a replacement for R123.

In some embodiments, the refrigerant composition includes a blend of three refrigerants.

In some embodiments, the refrigerant composition includes two components including three refrigerants.

In some embodiments, the refrigerant composition includes a two component blend, where one of the components is a refrigerant blend that, when first combined, is considered an azeotropic blend, azeotrope, near azeotropic, or the like. In some embodiments, the refrigerant blend is of two refrigerants. This refrigerant blend is considered the first component, which is present as an azeotrope or near azeotrope, and is then combined with a second component being another refrigerant. In some embodiments, the second component is a third refrigerant that, in some examples, will improve the capacity and/or the glide properties of the overall refrigerant composition. In some examples, improving the glide includes improving the capacity and/or reducing glide that would otherwise be present in the two component refrigerant blend alone.

Examples of azeotropic blends and/or near azeotropic blends are referred to in U.S. Pat. Nos. 9,003,797, 8,961,808, 8,680,037, 8,632,703, 7,972,524, US 2012/0104307, US 2013/0104548, US 2013/0104575, US 2013/0104573 US 2015/0014606, and WO 2011091404 all of which are incorporated by reference in their entirety.

In some embodiments, the refrigerant composition is a blend that considers properties including for example solubility in lubricant, toxicity, temperature glide, and global warming potential (GWP).

Below is Table 1, which includes labels and chemical names of refrigerants referred to hereinbelow by either of the label or the chemical name.

TABLE 1

Refrigerant Labels and Chemical Names

| Label | Chemical Name |
|---|---|
| R123 | 2,2-dichloro-1,1,1-trifluoroethane |
| R245ca | 1,1,2,2,3-pentafluoropropane |
| R245eb | 1,1,1,2,3-pentafluoropropane |
| R245fa | 1,1,1,3,3-pentafluoropropane |
| R1224yd(Z) | Z-1-chloro-2,3,3,3-tetrafluoropropene |
| R1224yd(E) | E-1-chloro-2,3,3,3-tetrafluoropropene |
| R1233xf | 2-chloro-3,3,3-trifluoropropene |
| R1233zd(E) | E-1-chloro-3,3,3-trifluoropropene |
| R1233zd(Z) | Z-1-chloro-3,3,3-trifluoropropene |
| R1336mzz(E) | E-1,1,1,3,3,3-hexafluorobut-2-ene |
| R1336mzz(Z) | Z-1,1,1,4,4,4-hexafluorobut-2-ene |
| R1438mzz(E) | E-1,1,1,4,4,5,5,5-octafluoropent-2-ene |
| R1130(E) | E-1,2-dichloroethene |

To match the properties of an existing refrigerant such as R123 that is scheduled for phase-out from commercial use, zeotropic refrigerants can be made by blending a lower pressure refrigerant, such as R1336mzz(Z), with a higher pressure refrigerant. Known higher pressure refrigerants that could potentially be blended with R1336mzz(Z) for this purpose are listed below in Table 2.

TABLE 2

| Refrigerant | Normal boiling point (° F.) | GWP* | OEL** | Flammability Class |
|---|---|---|---|---|
| R1336mzz(Z) | 92.3 | 2 | 500 | 1 |
| R123 | 82.1 | 79 | 50 | 1 |
| R245ca | 77.75 | 716 | Unknown | 2L |
| R245eb | 72.8 | 290 | Unknown | 2L |
| R1233zd(E) | 65.0 | 1 | 800 | 1 |
| R245fa | 59.3 | 858 | 300 | 1 |
| R1224yd(Z) | 58.1 | 1 | Unknown | 1 |
| R1224yd(E) | Estimated | Unknown | Unknown | 1 |
| R1336mzz(E) | 45.50 | Unknown | Unknown | 1 |
| R1233xf | 29.0 | Unknown | Unknown | 1 |

*GWP is global warming potential,
**OEL is occupational exposure limits

Estimates of the thermodynamic properties of refrigerant blends can be made using computer software tools such as REFPROP published by NIST. The compositions, GWPs, temperature glides, and compressor discharge states for binary combinations of the above refrigerants with R1336mzz(Z) that produce capacities similar to R123 are in Table 3. Typical chiller operating conditions of 40° F./100° F. saturation temperatures and a 0.8 compressor isentropic efficiency are assumed.

TABLE 3

Properties of Binary Blends Containing R1336mzz(Z).

| Refrigerant | Composition % wt | GWP | Cond glide (° F.) | CDSH* (° F.) or CDQ** | COP† | ΔH‡ |
|---|---|---|---|---|---|---|
| R1336mzz(Z)/R245ca | 30/70 | 502 | 0.7 | 1.0 | 0.981 | 1.118 |
| R1336mzz(Z)/R245eb | 50/50 | 146 | 2.0 | 1.0 | 0.987 | 1.080 |
| R1336mzz(Z)/R1233zd(E) | 70/30 | 2 | 4.1 | 0.994 | 0.977 | 1.015 |
| R1336mzz(Z)/R245fa | 70/30 | 259 | 5.2 | 0.992 | 0.976 | 1.024 |
| R1336mzz(Z)/R1224yd(Z) | 73/27 | 2 | 6.0 | 0.994 | 0.977 | 0.975 |
| R1336mzz(Z)/R1336mzz(E) | 77.5/22.5 | 2 | 8.9 | 0.983 | 0.973 | 0.957 |

*CDSH is compressor discharge superheat.
**CDQ is compressor discharge vapor quality. If the value in this column is less than unity, then the value indicates CDQ.
†COP is coefficient of performance relative to R123.
‡ΔH° is the isentropic enthalpy rise across the compressor relative to R123 and represents the kinetic energy needed to be produced by a centrifugal compressor computed as the square of the product of the impeller radius and its rotational speed, $(r\omega)^2$.

As shown in Table 3, the R1336mzz(Z)/R245ca blend has the smallest temperature glide because R245ca is nearest to R123 in pressure. However, a relatively large proportion of R245ca is needed to match R123 capacity because its normal boiling point is similar to R123's. This results in a relatively higher GWP. The blend may also likely be flammable (2 L) because of the relatively large concentration of R245ca.

The R1336mzz(Z)/R245eb blend (also known as label DR-40), has a relatively higher pressure ratio for the same temperature lift, which may interact with a centrifugal compressor map to reduce capacity for a fixed impeller diameter. Testing in chillers has shown the detrimental effects of the temperature glide to be acceptable.

Using relatively higher pressure refrigerants R245fa, R1224yd(Z), and R1336mzz(E) increases the temperature glide. In addition, the higher relative amount of R1336mzz(Z) in the blend may present a risk of experiencing wet compression, that is, a compressor discharge vapor quality less than unity that represents the undesirable presence of liquid refrigerant in the compressed gas.

The blends of Table 3 are predicted to have lower thermodynamic efficiencies than R123 by 1.5% to 2.5%, even before considering the effects of degraded heat transfer performance and different compressor pressure ratios.

R1438mzz(E), i.e. E-1,1,1,4,4,5,5,5-octafluorpent-2-ene, has also been under consideration as a fluid for application in cooling, heating, and power cycles, as well as a foam blowing agent. The normal boiling point of R1438mzz(E) is ~88° F., closer to R123 than R1336mzz(Z). U.S. Pat. No. 8,632,703B2 lists a number of fluids that can be blended with R1438mzz(E) to approximately obtain R123 pressures, including:

methyl formate @ 8% mol added to R1438mzz(E) (forms azeotrope at ~50% mol)
n-pentane at ~2% mol added (forms azeotrope at ~40% mol R1438mzz(Z))
isopentane at ~2% mol added (forms azeotrope at ~40% mol R1438mzz(Z))
R1130(E) or DCE @ ~2% mol added or ~70% mol added (forms azeotrope at ~70% mol R1438)
R245fa at ~8% mol added (zeotropic over full range)
cyclopentane at ~2% mol added or ~85% mol added (forms azeotrope at ~70% mol R1438)
R1336mzz(Z) at ~70% mol added—azeotropic blend that matches R123 pressure at 40° C.

An approximate thermodynamics property model for R1438mzz(Z) suggests that this fluid is likely subject to significant wet compression and may not be suitable for use in vapor compression systems. It is also potentially an expensive molecule to manufacture, having eight fluorines spread across a five carbon chain (with a double bond).

Applicant has found, however, that blends of R1336mzz(Z)/R1233zd(E) offer a potential option of a refrigerant composition as a binary blend as a replacement for R123. The GWP is very low (<10). Both components are non-flammable. The temperature glide is larger than desired, but manageable. The isentropic enthalpy rise is similar to R123. Both of these fluids have known toxicity profiles; and these blends would be classified as "A1" by ASHRAE Standard 34.

Based on this screening exercise, measurements of the actual equilibrium saturation pressure versus temperature relationship for the R1336mzz(Z)/R1233zd(E) blend were made to better calibrate the calculations by REFPROP. The data collected are listed in Table 4.

TABLE 4

Equilibrium pressures and temperatures for two compositions of R1336mzz(Z)/R1233zd(E) binary blends.

| Liquid Temperature ° F. | Vapor Pressure psia |
|---|---|
| 64.89% wt R1336mzz(Z)/35.11% wt R1233zd(E) | |
| 70.70 | 13.94 |
| 76.44 | 15.68 |
| 80.56 | 17.03 |
| 85.32 | 18.70 |
| 90.31 | 20.58 |
| 95.71 | 22.77 |
| 100.48 | 24.87 |
| 104.92 | 26.96 |
| 110.43 | 29.74 |
| 120.08 | 35.12 |
| 129.75 | 41.23 |
| 139.76 | 48.35 |
| 80.16% wt R1336mzz(Z)/19.84% wt R1233zd(E) | |
| 73.00 | 13.16 |
| 77.47 | 14.43 |
| 80.31 | 15.28 |
| 85.07 | 16.84 |
| 90.59 | 18.73 |
| 95.12 | 20.40 |
| 100.23 | 22.43 |
| 106.86 | 25.31 |
| 110.31 | 26.93 |
| 120.06 | 31.92 |
| 131.17 | 38.43 |
| 139.41 | 43.89 |

Predictions of chiller performance with R1336mzz(Z)/R1233zd(E) blends were then updated using the calibrated thermodynamic properties. The results are listed in Table 5.

TABLE 5

Performance Characteristics of R1336mzz(Z)/R1233zd(E) Binary Blends
at chiller conditions of 40° F./100° F. saturation temperatures
and 0.8 compressor isentropic efficiency.

| Refrigerant | Comp % wt | Comp % mol | Cond glide (° F.) | CDQ* | CAP** | COP† | ΔH‡ | Tsat @ 15 psig |
|---|---|---|---|---|---|---|---|---|
| R1336mzz(Z)/- | 82/18 | 78.4/21.6 | 5.4 | 0.989 | 0.951 | 0.975 | 0.997 | 116.8 |
| R1233zd(E) | 76/24 | 71.6/28.4 | 5.5 | 0.992 | 1.002 | 0.975 | 1.004 | 114.1 |
|  | 70/30 | 65.0/35.0 | 5.3 | 0.994 | 1.050 | 0.976 | 1.010 | 111.8 |
|  | 63/37 | 57.5/42.5 | 4.6 | 0.997 | 1.101 | 0.977 | 1.017 | 109.7 |

Attorney Docket No0 20424.0310USWO
*CDQ is compressor discharge vapor quality.
**CAP is capacity relative to R123.
†COP is coefficient of performance relative to R123.
‡ΔH° is isentropic enthalpy rise across the compressor relative to R123.

It will be noted that R1336mzz(Z) and R1233zd(E) have a stronger thermodynamic interaction than originally predicted by REFPROP and so the useful compositions shift to higher concentrations of R1336mzz(Z). It will be appreciated that the 76% wt/24% wt blend of R1336mzz(Z)/R1233zd(E) is merely exemplary as other relative concentrations that may be employed. For example, in some embodiments, the range of R1233zd(E) which may be used may be 18-37% wt or 21.6-42.5% mol, in some embodiments, it may be at least 19% mol but no more than 36% mol, and yet in other embodiments, it may be higher than 19% mol but less than 36% mol.

In some embodiments, it may be desired to increase the concentration of R1233zd(E) to as much as 37% wt (42.5% mol) to attain target capacity, while compensating for reduced heat transfer performance. Increasing the R1233zd(E) concentration slightly reduces the temperature glide, reduces the potential for wet compression, but slightly increases the compressor isentropic enthalpy rise. In addition, the operating pressures are increasing, thereby restricting the maximum operating temperature for a given design pressure limit. On the other hand, higher R1233zd(E) concentrations also increase the potential that the blend becomes miscible with the mineral oil typically used with R123 rather than having to use POE or PVE oils.

Described hereinbelow are three refrigerant blends or an additional refrigerant added to an azeotropic/near azeotropic blend, which can improve capacity, reduce or limit temperature glide, and/or match many R123 properties.

Two Component Blends, which Include a Binary Blend as One of the Two Components

Although the R1336mzz(Z)/R1233zd(E) binary blends described above may be used as suitable replacements for R123, their relative large temperature glides make them less than ideal. Described hereinbelow are three refrigerant blends in the form an additional component added to a binary azeotropic or near azeotropic blends.

The temperature glide would be lower if the lower pressure component of a blend were closer to the properties of R123 than the R1336mzz(Z) refrigerant discussed above. An azeotropic blend of R1336mzz(Z) and R1130(E) (trans-dichloroethylene or DCE) is disclosed in U.S. Pat. No. 7,972,524 B2, labeled as DR-10, where the azeotropic composition is near 75% wt/25% wt. DCE is a very common chemical used in a variety of applications. It has very low GWP and known toxicity (OEL=200 ppm). Although DCE is flammable, the azeotropic blend with R1336mzz(Z) is not.

In some embodiments, taking an azeotropic blend, such as for example DR-10 that has properties more similar to R123 than R1336mzz(Z) and adding a third, higher pressure component to the DR-10 blend, can potentially allow lower temperature glide than certain binary blends discussed above. It will be appreciated that the azeotropic blend DR-10 is merely exemplary as other azeotropic blends may be used.

In some embodiments, the azeotropic blend, such as for example DR-10, may be treated as the first component and then adding a second component to increase the capacity of the final blend. The proportions of R1336mzz(Z) to R1130(E) are kept in the same 3:1 ratio (or about 3:1 ratio) as the base DR-10 mixture to keep the azeotropic nature in place. Table 6 below lists blend compositions that match the capacity of R123 based on nominal REFPROP thermodynamic predictions.

In some embodiments, the refrigerant composition may be considered to include three refrigerants in a two component composition, where the first component is a blend of two refrigerants making up the azeotrope or near-azeotrope, and adding a third refrigerant to the azeotropic or near-azeotrope blend as the second component.

TABLE 6

DR-10-based Blends That Match the Capacity of R123.

| Refrigerant | Comp % wt | GWP | Cond glide (° F.) | CDSH (° F.) | COP | ΔH |
|---|---|---|---|---|---|---|
| R1336mzz(Z)/DCE (DR-10) (CAP = 0.945) | 75/25 | 2 | 0.0 | 4.0 | 0.995 | 1.102 |
| R1336mzz(Z)/DCE/R245ca | 20/7/73 | 526 | 0.6 | 4.4 | 0.987 | 1.166 |
| R1336mzz(Z)/DCE/R245eb | 45/15/40 | 117 | 0.6 | 6.2 | 0.997 | 1.147 |
| R1336mzz(Z)/DCE/R1233zd(E) | 60/20/20 | 2 | 0.8 | 5.1 | 0.994 | 1.114 |
| R1336mzz(Z)/DCE/R1224yd(Z) | 64/21/15 | 1 | 1.1 | 5.2 | 0.994 | 1.090 |

TABLE 6-continued

DR-10-based Blends That Match the Capacity of R123.

| Refrigerant | Comp % wt | GWP | Cond glide ° F.) | CDSH (° F.) | COP | ΔH |
|---|---|---|---|---|---|---|
| R1336mzz(Z)/DCE/R245fa | 65/22/13 | 116 | 0.9 | 4.3 | 0.990 | 1.112 |
| R1336mzz(Z)/DCE/R1336mzz(E) | 68/23/9 | 2 | 1.5 | 3.4 | 0.994 | 1.083 |

With further reference to DR-10, one example of the third refrigerant is to add R1233zd(E) with DR-10. The resulting composition has very low GWP (<10), a temperature glide potentially less than 1° F. (smaller than DR-40), and is suitably away from wet compression. The thermodynamic efficiency (COP) is better than DR-40. For chiller designs having a maximum allowed working pressure (MAWP) of 15 psig, the maximum condenser saturation temperature is 118.5° F. about 1.5° F. below that for R123 and less limiting than the binary blends considered above.

In order to better calibrate the thermodynamic properties calculated by REFPROP for the blending of DR-10 and R1233zd(E), measurements of equilibrium saturation temperatures and pressures were made. The results are listed in Table 7.

TABLE 7

Equilibrium pressures and temperatures for three compositions of DR 10/R1233zd(E) blends where DR 10 has the azeotropic composition of 75% wt R1336mzz(Z)/25% wt R1130(E).

| Liquid Temp ° F. | Vapor Pressure psia |
|---|---|
| 90.26% wt DR-10 9.74% wt R-1233zd(E) | |
| 71.20 | 12.17 |
| 75.38 | 13.27 |
| 80.74 | 14.78 |
| 84.66 | 16.00 |
| 90.35 | 17.92 |
| 95.95 | 19.92 |
| 100.41 | 21.65 |
| 105.24 | 23.67 |
| 110.03 | 25.81 |
| 120.99 | 31.27 |
| 130.18 | 36.50 |
| 138.42 | 41.44 |

TABLE 7-continued

Equilibrium pressures and temperatures for three compositions of DR 10/R1233zd(E) blends where DR 10 has the azeotropic composition of 75% wt R1336mzz(Z)/25% wt R1130(E).

| Liquid Temp ° F. | Vapor Pressure psia |
|---|---|
| 78.70% wt DR-10 21.30% wt R1233zd(E) | |
| 69.96 | 12.69 |
| 75.59 | 14.22 |
| 80.77 | 15.77 |
| 85.16 | 17.22 |
| 89.32 | 18.68 |
| 94.88 | 20.76 |
| 99.89 | 22.79 |
| 106.05 | 25.49 |
| 109.81 | 27.26 |
| 121.08 | 33.12 |
| 131.50 | 39.43 |
| 139.76 | 44.99 |
| 64.18% wt DR-10 35.82% wt R1233zd(E) | |
| 75.87 | 15.38 |
| 81.37 | 17.19 |
| 85.09 | 18.59 |
| 89.94 | 20.38 |
| 95.48 | 22.58 |
| 100.29 | 24.65 |
| 105.57 | 27.09 |
| 109.39 | 28.99 |
| 119.89 | 34.67 |
| 130.40 | 41.17 |
| 138.31 | 46.71 |

Predictions of chiller performance with R1336mzz(Z)/DCE/R1233zd(E) blends were then updated using the calibrated thermodynamic properties. The results are listed in Table 8. It will be noted that R1233zd(E) has a stronger thermodynamic interaction with DR-10 than originally predicted by REFPROP and so the useful compositions shift to lower concentrations of R1233zd(E).

TABLE 8

Performance characteristics of DR-10/R1233zd(E) blends relative to R123 at chiller operating conditions of 40° F./100° F. saturation temperatures and a 0.8 compressor isentropic efficiency.

| Refrigerant | Comp % wt | Cond glide (° F.) | CAP | COP | CDSH (° F.) | ΔH° | Tsat @ 15 psig | OEL (ppm) |
|---|---|---|---|---|---|---|---|---|
| R1336mzz(Z)/ | 75/25/0 | 0 | 0.946 | 0.998 | 3.9 | 1.102 | 121.9 | 324 |
| R1130(E)/- | 71/24/5 | 0.8 | 0.975 | 0.994 | 4.1 | 1.104 | 119.8 | 335 |
| R1233zd(E) | 67.5/22.5/10 | 1.4 | 1.005 | 0.993 | 4.4 | 1.106 | 117.9 | 346 |
| | 64.5/21.5/14 | 1.8 | 1.028 | 0.993 | 4.6 | 1.106 | 116.5 | 356 |
| | 61.5/20.5/18 | 2.0 | 1.050 | 0.993 | 4.7 | 1.107 | 115.2 | 366 |
| | 58.5/19.5/22 | 2.2 | 1.072 | 0.993 | 4.9 | 1.107 | 114.0 | 376 |
| | 55.5/18.5/26 | 2.3 | 1.093 | 0.992 | 5.1 | 1.107 | 112.9 | 387 |

The blend of R1336mzz(Z) and R1130(E) (aka DCE) as DR-10 is non-flammable, and blends of DR-10 with R1233zd(E) are also non-flammable. Since both DCE and R1233zd(E) are miscible with mineral oil, the blend may become compatible with mineral oil as the R1233zd(E) concentration increases. This three component or ternary blend may also be less expensive, with the lower cost R1233zd(E) offsetting some of the R1336mzz(Z) in the DR-10, and may be less expensive than the DR-40 blend of R1336mzz(Z) and R245eb.

Figure 2:
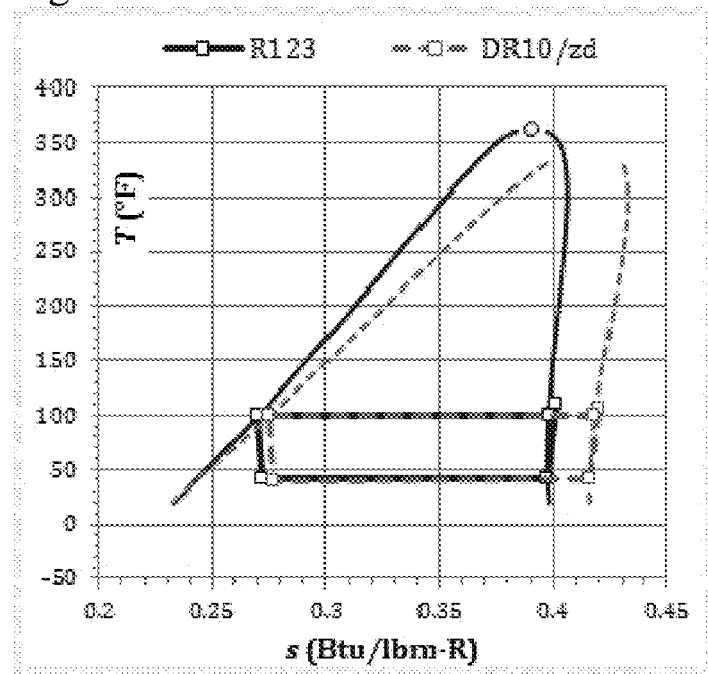

FIG. 1 and FIG. 2 also show the Ph and Ts diagrams for the 60/20/20 blend laid on top of R123. FIG. 1 shows a Ph diagram of a 60/20/20 blend along with R123 at 40° F./100° F. saturation temperatures and 0.8 compressor isentropic efficiency. FIG. 2 shows a Ts diagram of the 60/20/20 blend along with R123 at 40° F./100° F. saturation temperatures and 0.8 compressor isentropic efficiency.

Figure 3:
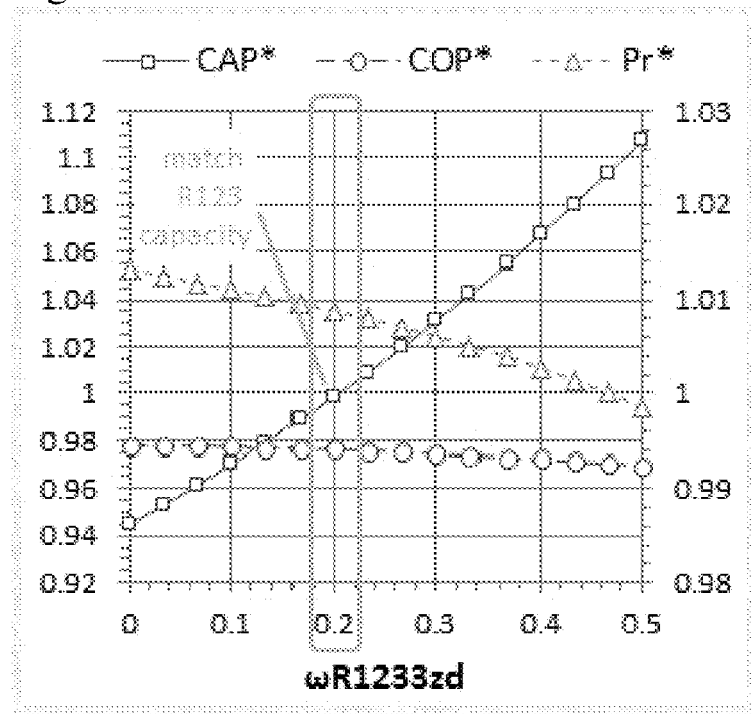

The trends in capacity, efficiency, and pressure ratio relative to R123 as the R1233zd(E) concentration is increased from zero (i.e., starting with DR-10) are shown in FIG. 3.

FIG. 3 shows trends in capacity (CAP*), efficiency (COP*), and pressure ratio (Pr*) as the R1233zd(E) concentration increases.

Capacity can be adjusted by selecting the proportion of R1233zd(E) as shown in Table 8. At CAP=1.093, the concentration of DCE together with R1233zd(E) is 44.5% wt, suggesting a higher probability of being compatible with mineral oil lubricants.

Accepting a slightly higher capacity lowers the concentration of DCE. At CAP=1.05 (the mass fraction of R1233zd 36% wt), the mass fraction of DCE drops to ~16% wt; see FIG. 5. At this point, the concentration of DCE together with R1233zd(E) is 52% wt, suggesting a higher probability of being compatible with mineral oil lubricants.

Figure 5:
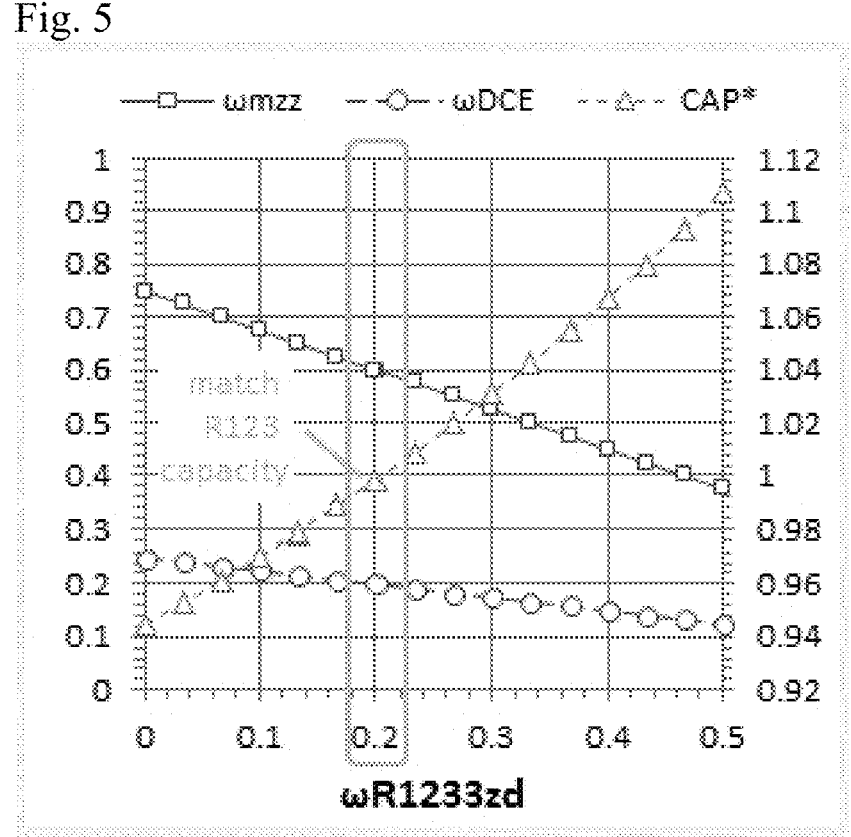

FIG. 5 shows concentrations of R1336mzz(Z) ("mzz") and R1130(E) ("DCE") as a function of R1233zd(E) concentration. Capacity relative to R123 is also plotted.

Thermodynamic COP is predicted to decrease relatively slightly as the R1233zd(E) concentration increases, but remains within 1% of R123. Actual COP may be further reduced by slightly degraded heat transfer from the additional glide. The pressure ratio decreases toward R123 as the R1233zd(E) concentration increases. See FIG. 3.

Operating pressures are increasing as the R1233zd concentration increases. However, at CAP of about 1.05, the saturation temperature at the MAWP is still >115° F.; see FIG. 4. Temperature glide is also increased to 1.5° F.d or to 1.8° F.d; but these levels are very similar to what we are experiencing with DR-40 above.

Figure 4:
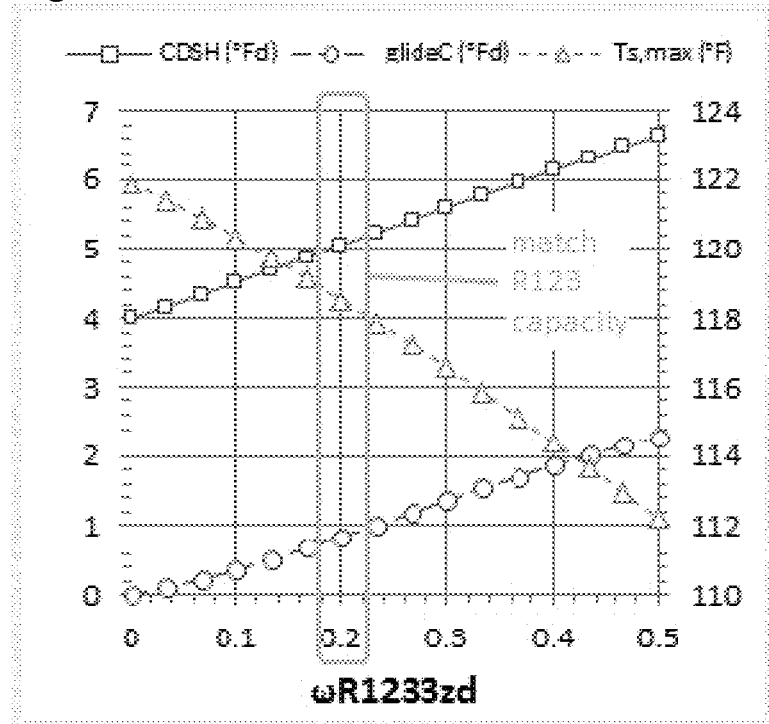

FIG. 4 shows trends in compressor discharge superheat (CDSH) and temperature glide in the condenser (glideC).

In some cases, temperature glide also increases up to 2.3° F.; but these levels are very similar to those experienced with DR-40 above.

As shown in the Figures, capacity increases as the R1233zd(E) content increases. Temperature glide increases as well, but stays at levels similar to or below DR-40. COP and pressure ratio are relatively constant. Operating pressures increase slightly with R1233zd(E) content, restricting the maximum condenser saturation temperature. For R1233zd(E) concentrations above 31% wt, the blend would be considered Class "A1" under ASHRAE Standard 34. As R1233zd(E) content increases, there is increasing potential that the blend will be miscible with mineral oil lubricants.

The compressor isentropic enthalpy rise for these blends of DR-10 and R1233zd(E) are about 10% greater than for R123. In an embodiment, compressor impellers may be used with a diameter or a rotational speed about 5% larger than used for R123 to achieve capacity similar to R123 for a given temperature lift.

Although the OEL increases as the R1233zd(E) concentration increases, the values remain below the 400 ppm threshold between being a Class A (OEL>400 ppm) or a Class B (OEL<400) fluid per ASHRAE Standard 34. However, the OELs of the blends listed in Table 8 are greater than R123's OEL of 50 ppm where R123 has been employed successfully as a Class B fluid for many years.

It will be appreciated that the amounts reported in Table 8 for each of the refrigerants in the R1336mzz(Z)/DCE/R1233zd(E) blend may be the upper and/or lower end points of a range of potential amounts and range combinations for each refrigerant in the blend.

In an embodiment, the ratio of R1336mzz(Z)/R1130(E) is in a ratio at or about 3:1.

It will also be appreciated that each of the resulting refrigerant composition properties listed in Table 8 may make up an upper and/or a lower end point(s) in various range combinations of properties suitable for a refrigerant composition herein.

For example, the wt % of R1336mzz(Z) in some embodiments may be at or about 50 wt % to at or about 80 wt %, or in some embodiments at or about 55 wt % to at or about 71 wt %, or in some embodiments at or about 61 wt % to at or about 68 wt %.

For example, the wt % of R1130(E) in some embodiments may be at or about 16 wt % to at or about 27 wt %, or in some embodiments at or about 18 wt % to at or about 24 wt %, or in some embodiments at or about 20 wt % to at or about 23 wt %.

For example, the wt % of R1233zd(E) in some embodiments may be at or about 5 wt % to at or about 30 wt %, or in some embodiments at or about 5 wt % to at or about 26 wt %, or in some embodiments at or about 10 wt % to at or about 18 wt %.

It will also be appreciated that each of the wt % reported for each of the blend components in Table 8 may make up an upper and/or a lower end point(s) in various range combinations, e.g. to define further ranges, such as for example relatively more narrow ranges.

It will be appreciated that each of the resulting refrigerant composition properties listed in Table 8 may make up an upper and/or a lower end point(s) in various range combinations of properties suitable for a refrigerant composition herein.

In some embodiments, the refrigerant composition including the two components has a GWP is 0-675, or in some embodiments it is 675 or less, or in some embodiments is 150 or less. In some embodiments here, the refrigerant compositions have GWPs less than 10. In some embodiments, the GWPs are less than 2.

In some embodiments, the refrigerant compositions herein have a temperature glide of 10° F. or less, or in some embodiments it is at or about 0 to at or about 10° F. In some embodiments, it at or about 5.5° F. In some embodiments, it is at or about 4.6° F. to at or about 5.5° F. In some embodiments, it is at or about 0.8° F. to at or about 2.2° F., or in some embodiments it is at or about 1.4° F. to at or about 2.0° F.

In some embodiments, refrigerant compositions herein have a compressor discharge quality (CDQ) close to 1.0. In some embodiments, CDQ is greater than 0.99, or in some embodiments it is greater than 0.995. In some embodiments, the compressor discharge superheat (CDSH) is greater than zero. In some embodiments, it is greater than or equal to 3.9° F. and less than or equal to 5.1° F. In some embodiments, it ranges from at or about 4.4° F. to at or about 4.7° F.

In some embodiments, refrigerant compositions herein have an occupational exposure limits (OEL) of higher than 50 ppm, or in some embodiments higher than 300 ppm, or in some embodiments at or about 350 ppm, or in some embodiments at or about 390 ppm. In some embodiments, the OEL is at or about 346 ppm to at or about 366 ppm.

In some embodiments, refrigerant compositions herein have a thermodynamic coefficient of performance relative to R123 (COP) of near 1.0, or in some embodiments at or about 0.975 to at or about 0.977, or in some embodiments at or about 0.993.

In some embodiments, refrigerant compositions herein have a capacity ratio, e.g. relative to R123 (CAP), to be 1.00±10%. In some embodiments, CAP is at or about 0.951 to at or about 1.101. In some embodiments, CAP is at or about 0.975 to at or about 1.093. In some embodiments, CAP is at or about 1.005 to at or about 1.050. In an embodiment, CAP is at or about 1.00, where a higher CAP can compensate for impact of glide on heat transfer performance. It will be appreciated that CAP may be determined in reference to refrigerants other than R123.

In some embodiments, refrigerant compositions herein have a maximum condenser saturation temperature (Tsat) greater than 105° F., or in some embodiments it is at or close to 119.9° F. In some embodiments, Tsat is at or about 109.7° F. to at or about 116.8° F., or in some embodiments it is at or about 111.8° F. to at or about 114.1° F. In some embodiments, Tsat is at or about 112.9° F. to at or about 119.8° F., or in some embodiments it is at or about 115.2° F. to at or about 117.9° F.

In some embodiments, refrigerant compositions herein have a compressor isentropic enthalpy rise relative to R123 ($\Delta H°$) of at or about 1.0, or in some embodiments, $\Delta H°$ can range from at or about 0.997 to at or about 1.107. In some embodiments, the compressor isentropic enthalpy rise is at or about 1.1, or in some embodiments, $\Delta H°$ can range from at or about 1.102 to at or about 1.107.

In some embodiments, refrigerant compositions herein are non-flammable (e.g. Class 1), have an OEL of at least 50 ppm, and very low GWP, e.g. 10 or less.

Referring to Table 9 below, capacity increases as the R1233zd(E) content increases. Temperature glide increases as well, but stays at levels similar to or below DR-40. COP and pressure ratio are relatively constant. Operating pressures increase slightly with R1233zd(E) content, restricting the maximum condenser saturation temperature. For R1233zd(E) concentrations above 31% wt, the blend would be considered Class "A1" under ASHRAE Standard 34. As R1233zd(E) content increases, there is increasing potential that the blend will be miscible with mineral oil lubricants.

The characteristics of a further range of R1336mzz(Z)/DCE/R1233zd(E) blends are listed in Table 9.

It will be appreciated that the amounts reported in Table 9 for each of the refrigerants in the R1336mzz(Z)/DCE/R1233zd(E) blend may be the upper and/or lower end points of a range of potential amounts and range combinations for each refrigerant in the blend.

In an embodiment, the ratio of R1336mzz(Z)/R1130(E) is in a ratio at or about 3:1.

It will also be appreciated that each of the resulting refrigerant composition properties listed in Table 9 may make up an upper and/or a lower end point(s) in various range combinations of properties suitable for a refrigerant composition herein.

For example, the wt % of R1336mzz(Z) in some embodiments may be at or about 40 wt % to at or about 70 wt %, or in some embodiments at or about 42 wt % to at or about 66 wt %, or in some embodiments at or about 48 wt % to at or about 60 wt %.

For example, the wt % of R1130(E) in some embodiments may be at or about 10 wt % to at or about 23 wt %, or in some embodiments at or about 14 wt % to at or about 22 wt %, or in some embodiments at or about 16 wt % to at or about 20 wt %.

For example, the wt % of R1233zd(E) in some embodiments may be at or about 10 wt % to at or about 45 wt %, or in some embodiments at or about 12 wt % to at or about 44 wt %, or in some embodiments at or about 20 wt % to at or about 36 wt %.

It will also be appreciated that each of the wt % reported for each of the blend components in Table 9 may make up an upper and/or a lower end point(s) in various range combinations, e.g. to define further ranges, such as for example relatively more narrow ranges.

It will be appreciated that each of the resulting refrigerant composition properties listed in Table 9 may make up an upper and/or a lower end point(s) in various range combinations of properties suitable for a refrigerant composition herein.

In some embodiments, the refrigerant composition including the two components has a GWP is 0-675, or in some embodiments it is 675 or less, or in some embodiments is 150 or less. In some embodiments here, the refrigerant compositions have GWPs less than 10. In some embodiments, the GWPs are less than 2.

In some embodiments, refrigerant compositions herein have a glide (e.g. glide in the condenser (cond glide (° F.)) of 10° F. or less, or in some embodiments it is at or about 0 to at or about 10° F., or in some embodiments it is less than 5.0° F., or in some embodiments it is at or about 0 to at or about 5° F. In some embodiments, it at or about 4.1° F. or no more than 4.1° F. In some embodiments, it is at or about 3.8° F. to at or about 4.1° F. In some embodiments, it is at or

TABLE 9

Performance Characteristics of DR-10-based Blends Relative to R123.

| Refrigerant | Comp % wt | Cond glide (° F.) | CAP | COP | (Pc/Pe) | Tsat @ 15 psig | OEL (ppm) |
|---|---|---|---|---|---|---|---|
| R1336mzz(Z)/ | 66/22/12 | 0.5 | 0.976 | 0.994 | 1.011 | 120.0 | 351 |
| R1130(E)/- | 60/20/20 | 0.8 | 0.999 | 0.994 | 1.009 | 118.5 | 371 |
| R1233zd(E) | 54/18/28 | 1.3 | 1.024 | 0.994 | 1.007 | 117.0 | 393 |
| | 52/17.3/30.7 | 1.4 | 1.033 | 0.994 | 1.006 | 116.4 | 401 |
| | 48/16/36 | 1.7 | 1.052 | 0.993 | 1.004 | 115.3 | 418 |
| | 42/14/44 | 2.1 | 1.083 | 0.993 | 1.001 | 113.5 | 446 |

Pc/Pe is pressure ratio of the condenser and the evaporator relative to R123.

about 0.5° F. to at or about 2.1° F., or in some embodiments it is at or about 0.8° F. to at or about 1.7° F.

In some embodiments, refrigerant compositions herein have a compressor discharge superheat (CDSH) or (CDQ) at or about 1.0, or in some embodiments it is close to 1.0, or in some embodiments it is equal to or greater than 1.0, or in some embodiments it is not less than 1.0. In some embodiments, it is at or about 5-10% less than 1.0. In some embodiments, it is at or about 0.994 or greater, at or about 0.995 or greater, or at or about 0.996 or greater, 0.997 or greater, or at or about 0.998 or greater, or at or about 0.999 or greater.

In some embodiments, refrigerant compositions herein have an occupational exposure limits (OEL) of higher than 50 ppm, or in some embodiments higher than 300 ppm, or in some embodiments at or about 350 ppm, or in some embodiments at or about 400 ppm (e.g. satisfying Class A), or in some embodiments at least 400 ppm. In some embodiments, the OEL is at or about 351 ppm to at or about 446 ppm.

R1336mzz(Z)/R1130(E). Ranges of compositions and their characteristics are listed in Table 10 below. In some embodiments, the ratio of R1336mzz(Z) to DCE is kept at or about 3:1. The addition of about 40% wt R245eb to DR-10. Temperature glides are smaller when using R245eb than they are when using R1233zd(E), because of R245eb's lower pressure. Use of R245eb may result in a relatively higher GWP (because of the R245eb), relatively higher pressure ratios, relatively lower maximum saturation temperature, and relatively higher price. As both R245eb and DCE are flammable, such a blend may be relatively more susceptible to flammability at certain concentrations. These blends also may be readily soluble with POE/PVE type lubricants but may not be as soluble in mineral oil as when using certain concentrations of R1233zd(E).

Table 10 shows a Range of R1336mzz(Z)/R1130(E)/R245eb ternary blends. Conditions are 40° F./100° F. saturation temperatures and 0.8 compressor efficiency and showing DR-10 as a reference.

TABLE 10

| Refrigerant | Comp % wt | Cond glide (° F.d) | CAP | COP | (Pc/Pe) | Tsat @ 15 psig | GWP |
|---|---|---|---|---|---|---|---|
| R1336mzz(Z)/ R1130(E)/ R245eb | 75/25/0 (DR-10) | 0.0 | 0.945 | 0.994 | 1.050 | 121.9 | 2 |
| | 45/15/40 | 0.6 | 1.008 | 0.997 | 1.045 | 117.6 | 117 |
| | 33/11/56 | 0.9 | 1.048 | 0.997 | 1.038 | 115.1 | 163 |
| | 21/7/72 | 1.0 | 1.098 | 0.997 | 1.013 | 112.5 | 209 |

In some embodiments, refrigerant compositions herein have a coefficient of performance relative to R123 (COP) of near 1.0, or in some embodiments at or about 0.975 to at or about 0.978, or in some embodiments at or about 0.993 to at or about 0.994.

In some embodiments, refrigerant compositions herein have a capacity ratio, e.g. relative to R123 (CAP) to be 1.05±10%. In some embodiments, CAP is at or about 0.948 to at or about 1.062. In some embodiments, CAP is at or about 0.976 to at or about 1.083. In some embodiments, CAP is at or about 0.999 to at or about 1.052. In an embodiment, CAP is at or about 1.00, where a higher CAP can compensate for impact of glide on heat transfer performance. It will be appreciated that CAP may be determined in reference to refrigerants other than R123.

In some embodiments, refrigerant compositions herein have a Tsat greater than 110, or in some embodiments it is at or close to 119.9. In some embodiments, Tsat is at or about 112.0 to at or about 118.0, or in some embodiments it is at or about 112.2 to at or about 117.8. In some embodiments, Tsat is at or about 113.0 to at or about 120.0, or in some embodiments it is at or about 113.5 to at or about 120.0, or in some embodiments it is at or about 115.0 to at or about 118.0, or in some embodiments it is at or about 115.3 to at or about 118.5.

In some embodiments, refrigerant compositions herein have a pressure ratio (Pc/Pe) of at or about 0.9 to at or about 1.1. In some embodiments, the pressure ratio is at or about 1.001 to at or about 1.011, or in some embodiments it is at or about 1.004 to at or about 1.009.

In some embodiments, refrigerant compositions herein are non-flammable (e.g. class 1), have an OEL of at least 50 ppm, relatively low GWP, e.g. 150 or less or 10 or less.

With further reference to Table 6 above, in some embodiments R245eb may be added to the azeotropic blend It will be appreciated that each of the wt % reported for each of the blend components in Table 10 may make up an upper and/or a lower end point(s) in various range combinations, e.g. to define further ranges, such as for example relatively more narrow ranges.

It will also be appreciated that each of the resulting refrigerant composition properties listed in Table 10 may make up an upper and/or a lower end point(s) in various range combinations of properties suitable for a refrigerant composition herein.

It will also be appreciated that the refrigerant composition properties described herein in some embodiments may apply to various refrigerant blends made up of R1336mzz(Z), R1130(E), and R245eb.

In some embodiments, refrigerant compositions (as a binary blend) herein include R1336mzz(Z) and R1233zd(E) at a range 88% wt/12% wt (CAP~0.9) to 63% wt/37% wt (CAP~1.1), where in some embodiments the range is 76% wt/24% wt (CAP~1.0) to 70% wt/30% wt (CAP~1.05).

In some embodiments, refrigerant compositions (as a ternary blend) herein include R1336mzz(Z), R1130(E), and R1233zd(E) at a range between 75% wt/25% wt/0% wt (CAP~0.95) and 54.5% wt/18% wt/27.5% wt (CAP~1.1), where in some embodiments the range is 67.5% wt/22.5% wt/10% wt (CAP~1.0) to 61.5% wt/20.5% wt/18% wt (CAP*~1.05).

In some embodiments, refrigerant compositions (as a binary blend) herein include R1336mzz(Z) and R1233zd(E) at a range 85% wt/15% wt (CAP~0.9) to 55% wt/45% wt, have a CAP~1.1, where in some embodiments the range is 70% wt/30% wt (CAP~1.0) to 65% wt/35% wt (CAP~1.03).

In some embodiments, refrigerant compositions (as a ternary blend) herein include R1336mzz(Z), R1130(E), and R1233zd(E) range between 75% wt/25% wt/0% wt (CAP~0.95) and 37.5% wt/12.5% wt/50% wt (CAP~1.1), where in some embodiments the range is 60% wt/20% wt/20% wt (CAP~1.0) to 48% wt/16% wt/36% wt (CAP*~1.05).

In some embodiments, the refrigerant composition herein is a suitable replacement for refrigerant R123 in terms of its properties and performance at various operating conditions in a refrigeration system.

In some embodiments, the refrigerant composition herein is a suitable "drop in" replacement and, in some embodiments, may be applied or otherwise implemented as a retrofit refrigerant composition.

In some embodiments, the refrigerant composition herein is suitable for use in various applications including for example a refrigeration system and/or a heating, ventilation, and air conditioning (HVAC) systems.

In some embodiments, such applications include fluid chiller applications, including for example water chillers. In some embodiments, a fluid chiller includes for example chillers operating with a centrifugal compressor. In some embodiments, a fluid chiller is hermetically sealed and in some examples operates at below atmospheric pressure. In some embodiments, the fluid chiller includes a purge system. In some embodiments, the purge system does not include a carbon canister or regeneration device.

In some embodiments, the refrigerant composition may be suitable for use in refrigeration systems which may employ screw compressors. In some embodiments, the refrigerant composition may be suitable for use in systems with a heat pump.

In some embodiments, the refrigerant composition may be suitable for use in a refrigeration system with one or more of an evaporator, condenser, and/or an economizer, and/or where the compressor has one or more stages of compression, such as including one to four stages of compression.

In some embodiments, the refrigerant composition may also include one or more stabilizers, which may be present in the refrigerant composition and/or in the lubricant with which the refrigerant composition may be present during operation.

In some embodiments, methods of producing the refrigerant composition are included herein.

In some embodiments, methods of reducing glide or limiting glide in a refrigerant composition are included herein.

In some embodiments, methods of operating a refrigeration system or unit are included herein and with implementation of the refrigerant compositions herein.

In some embodiments, methods of removing impurities from the refrigerant compositions are included herein, such as for example when used in operation or during servicing, along with other working fluids with which the refrigerant composition may be mixed (e.g. lubricant). In some embodiments, this can include use of a purge system.

In some embodiments, methods of storing the refrigerant compositions are included herein, including in replacement or refill vessels.

The refrigerant compositions may be prepared by any convenient method to combine the desired amounts of the individual components. A preferred method is to weigh the desired component amounts and thereafter combine the components in an appropriate vessel. Agitation may be used, if desired.

An alternative way for making refrigerant compositions may be a method for making a refrigerant blend composition, where the refrigerant blend composition includes a composition as disclosed herein. The method may include (i) reclaiming a volume of one or more components of a refrigerant composition from at least one refrigerant container, (ii) removing impurities sufficiently to enable reuse of said one or more of the reclaimed components, (iii) and optionally, combining all or part of said reclaimed volume of components with at least one additional refrigerant composition or component.

A refrigerant container may be any container in which is stored a refrigerant blend composition that has been used in a refrigeration apparatus, air-conditioning apparatus or heat pump apparatus. The refrigerant container may be the refrigeration apparatus, air-conditioning apparatus or heat pump apparatus in which the refrigerant blend was used. Additionally, the refrigerant container may be a storage container for collecting reclaimed refrigerant blend components, including but not limited to pressurized gas cylinders.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

The embodiments disclosed herein provide a refrigeration, air-conditioning or heat pump apparatus containing a refrigerant composition as described herein. In some embodiments, the refrigeration or air-conditioning apparatus may be a mobile apparatus. As used herein, mobile refrigeration apparatus or mobile air-conditioning apparatus refers to any refrigeration or air-conditioning apparatus incorporated into a transportation unit for the road, rail, sea or air. In addition, apparatus, which are meant to provide refrigeration or air-conditioning for a system independent of any moving carrier, known as "intermodal" systems, are included in the present invention. Such intermodal systems include "containers" (combined sea/land transport) as well as "swap bodies" (combined road and rail transport). The present invention is particularly useful for road transport refrigerating or air-conditioning apparatus, such as automobile air-conditioning apparatus or refrigerated road transport equipment.

The refrigerant compositions as disclosed herein may also be useful in stationary air-conditioning and heat pumps, e.g. chillers, high temperature heat pumps, residential and light commercial and commercial air-conditioning systems. In stationary refrigeration applications, the refrigerant compositions may be useful in equipment such as domestic refrigerators, ice machines, walk-in and reach-in coolers and freezers, and supermarket systems.

The present invention further relates to a method of using the refrigerant composition as a heat transfer fluid composition. The method comprises transporting the refrigerant composition from a heat source to a heat sink.

Heat transfer fluids are utilized to transfer, move or remove heat from one space, location, object or body to a different space, location, object or body by radiation, conduction, or convection. A heat transfer fluid may function as a secondary coolant by providing thermal transfer for cooling (or heating) from a remote refrigeration (or heating) system. In some systems, the heat transfer fluid may remain in a constant state throughout the transfer process (i.e., not evaporate or condense). Alternatively, evaporative cooling processes may utilize heat transfer fluids as well.

A heat source may be defined as any space, location, object or body from which it is desirable to transfer, move or remove heat. Examples of heat sources may be spaces (open or enclosed) requiring refrigeration or cooling, such as refrigerator or freezer cases in a supermarket, building spaces requiring air-conditioning, or the passenger compartment of an automobile requiring air-conditioning. A heat sink may be defined as any space, location, object or body capable of absorbing heat. A vapor compression refrigeration system is one example of such a heat sink.

U.S. Pat. No. 7,914,698 is incorporated by reference herein in its entirety.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A method of reducing temperature glide of a refrigerant composition, comprising:
   adding an amount of a first refrigerant to an amount of a second refrigerant to make a first component, the first component is an azeotropic or near azeotropic blend, the first refrigerant is R1336mzz(Z) and the second refrigerant is R1130(E);
   adding a second component to the first component, the second component is an amount of a third refrigerant to obtain a resulting refrigerant composition, wherein the third refrigerant is R1233zd(E);
   wherein the resulting refrigerant composition thereby exhibits reduced temperature glide, and
   wherein a respective weight percent of R1336mzz(Z)/R1130(E)/R1233zd(E) ranges from 67.5 wt %/22.5 wt %/10 wt % to 61.5 wt %/20.5 wt %/18 wt % by weight of the refrigerant composition.

2. The method of claim 1, wherein the first component is non-flammable, has a global warming potential (GWP) of less than 10, and is a suitable replacement for R123.

3. The method of claim 1, wherein a weight percentage ratio of R1336mzz(Z) and R1130(E) is at or about 3:1.

4. A system, comprising:
   a refrigerant composition including a first component, and a second component, the first component is a refrigerant blend of two refrigerants that, when first combined, is an azeotropic blend, the refrigerant blend including R1336mzz(Z) and R1130(E) to which the second component is added, the second component being a single refrigerant that reduces temperature glide of the refrigerant composition, the single refrigerant being R1233zd(E),
   wherein a respective weight percent of R1336mzz(Z)/R1130(E)/R1233zd(E) ranges from 67.5 wt %/22.5 wt %/10 wt % to 61.5 wt %/20.5 wt %/18 wt % by weight of the refrigerant composition.

5. A method of preparing a refrigerant composition, comprising:
   adding an amount of a first refrigerant to an amount of a second refrigerant to make a first component, the first component is an azeotropic or near azeotropic blend, the first refrigerant is R1336mzz(Z) and the second refrigerant is R1130(E); and
   adding a second component to the first component, the second component is an amount of a third refrigerant to obtain a resulting refrigerant composition, wherein the third refrigerant is R1233zd(E),
   wherein the resulting refrigerant composition exhibits reduced temperature glide, and
   wherein a respective weight percent of R1336mzz(Z)/R1130(E)/R1233zd(E) ranges from 67.5 wt %/22.5 wt %/10 wt % to 61.5 wt %/20.5 wt %/18 wt % by weight of the refrigerant composition.

6. The method of claim 5, wherein the adding an amount of the first refrigerant to an amount of the second refrigerant comprises weighing the amount of the first refrigerant and the amount of the second refrigerant, and combining the weighed amount of the first refrigerant with the weighed amount of the second refrigerant,
   the adding the second component comprises weighing the amount of the third refrigerant and combining the weighed amount of the third refrigerant with the first component.

7. The method of claim 5, further comprising reclaiming the first component from a volume of a refrigerant composition from at least one refrigerant container; removing impurities from the reclaimed volume of the refrigerant composition, and combining the first component, which is reclaimed, with the second component.

8. The method of claim 5, further comprising retrofitting an existing refrigerant composition, wherein the existing refrigerant composition includes the first component, and includes adding the second component at the location of the first component.

* * * * *